United States Patent
Okumura

(10) Patent No.: US 11,082,570 B2
(45) Date of Patent: Aug. 3, 2021

(54) INFORMATION PROCESSOR, CONTROL METHOD, AND COMPUTER-READABLE RECORDING MEDIUM HAVING STORED PROGRAM THAT CONTROL DISPLAY VISIBILITY

(71) Applicant: SHARP KABUSHIKI KAISHA, Sakai (JP)

(72) Inventor: Makoto Okumura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/678,874

(22) Filed: Nov. 8, 2019

(65) Prior Publication Data

US 2020/0153984 A1     May 14, 2020

(30) Foreign Application Priority Data

Nov. 13, 2018    (JP) ............................ JP2018-213191

(51) Int. Cl.
    *H04N 1/00*      (2006.01)
    *G06F 3/12*       (2006.01)
    *G10L 15/22*      (2006.01)

(52) U.S. Cl.
    CPC ....... *H04N 1/00403* (2013.01); *G06F 3/1285* (2013.01); *G10L 15/22* (2013.01); *H04N 1/0049* (2013.01); *H04N 1/00395* (2013.01); *G10L 2015/223* (2013.01)

(58) Field of Classification Search
    CPC .......................... G01L 15/22; G01L 2015/223
    See application file for complete search history.

(56) References Cited

U.S. PATENT DOCUMENTS

| | | | |
|---|---|---|---|
| 2001/0013854 A1* | 8/2001 | Ogoro | H04M 1/22 345/102 |
| 2002/0032044 A1 | 3/2002 | Kume | |
| 2008/0122825 A1* | 5/2008 | Choi | G06F 3/147 345/211 |
| 2015/0267960 A1* | 9/2015 | Cheon | F25D 29/00 62/127 |
| 2018/0189027 A1* | 7/2018 | Jeon | G10L 15/22 |

FOREIGN PATENT DOCUMENTS

| | | |
|---|---|---|
| EP | 1187437 A2 | 3/2002 |
| EP | 1187437 A3 | 11/2003 |
| JP | 2002-094656 A | 3/2002 |

* cited by examiner

*Primary Examiner* — Miya J Williams
(74) *Attorney, Agent, or Firm* — ScienBiziP, P.C.

(57) ABSTRACT

An information processor including a voice inputter, a display, and a controller is provided. The controller executes a voice operation mode allowing an operation by voice input via the voice inputter, and performs control to reduce visibility of the display when execution of the voice operation mode is started.

10 Claims, 15 Drawing Sheets

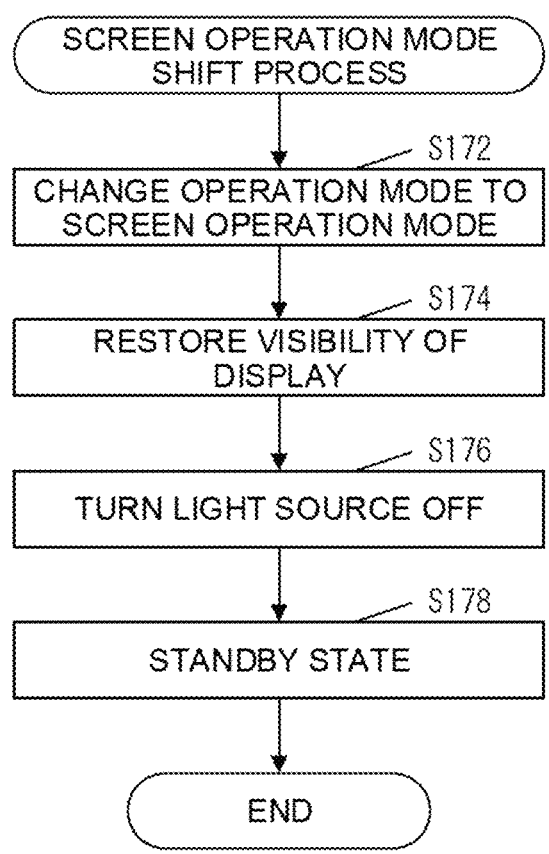

INFORMATION PROCESSOR, CONTROL METHOD, AND COMPUTER-READABLE RECORDING MEDIUM HAVING STORED PROGRAM THAT CONTROL DISPLAY VISIBILITY

BACKGROUND OF THE INVENTION

Field of the Invention

The present invention relates to an information processor, a control method, and a non-transitory computer-readable recording medium.

Description of the Background Art

Recently, as a result of improvement in voice recognition technology, devices capable of executing various kinds of processing, on the basis of the user's voice, have become widespread. In such a device, the user can perform an operation by voice as well as an operation via an operation panel or the like, by looking at a display. The user can adapt the operation according to use such as performing a voice operation for simple instructions, and performing an operation via the operation panel when detailed instructions are required.

Also, for devices having displays, a technology of turning off the light of the display according to the substance of the operation has been proposed. For example, when an incoming call or an operation by a user is detected while a wireless communication terminal is in operation, both a display and an operator of the terminal are lit. After that, at the time when a predetermined time has elapsed, it is determined whether the communication mode in effect corresponds to video communication or a voice call. If the mode corresponds to the video communication, lighting of the operator is unnecessary. Therefore, the light of the operator is turned off at the time it is determined that the video communication is in effect, and the light of the display is also turned off at the time when the communication is completed later. Meanwhile, when the communication mode in effect corresponds to the voice call, lighting of both the display and the operator is unnecessary. In view of the above, a technology regarding a wireless communication terminal which performs control such as turning off the light at the time it is determined that a voice call is in effect has been proposed (for example, see Japanese Unexamined Patent Application Publication No. 2002-94656).

There is a problem in that it is difficult for a user of a device enabling both an operation by voice and an operation via an operation panel to determine which operation can issue an instruction to the device. To deal with such problem, a solution considered is that when an operation based on voice is possible, turning off the light of a display, for example, can prompt the operation based on voice. However, the technology described in Japanese Unexamined Patent Application Publication No. 2002-94656 is a technology for turning off the light of the display and the operator according to the user's operation. That is, with the above technology, the user is unable to determine which operation is possible.

In view of the problem as described above, an object of the present invention is to provide an information processor and the like capable of carrying out control to reduce the visibility of a display when an operation by voice is performed.

SUMMARY OF THE INVENTION

In order to solve the problem as described above, the present invention provides an information processor including a voice inputter, a display, and a controller, in which the controller executes a voice operation mode allowing an operation by voice input via the voice inputter, and performs control to reduce visibility of the display when execution of the voice operation mode is started.

The information processor according to the present invention may be an information processor connectable to a conversation server. In that case, the information processor includes a voice inputter/outputter, a display, and a controller, and the controller performs control to reduce visibility of the display when a conversation with the conversation server is started on the basis of voice input through the voice inputter/outputter.

The present invention also provides a control method for an information processor including a voice inputter, a display, and a controller, the control method including: executing a voice operation mode allowing an operation by voice input via the voice inputter; and performing control to reduce visibility of the display when execution of the voice operation mode is started.

The control method according to the present invention may be a control method for an information processor including a voice inputter/outputter, a display, and a controller and being connectable to a conversation server. In that case, the control method includes performing control to reduce visibility of the display when a conversation with the conversation server is started on the basis of voice input through the voice inputter/outputter.

The present invention further provides a non-transitory computer-readable recording medium having stored therein a program that causes a computer including a voice inputter, a display, and a controller to implement: a voice operation mode allowing an operation by voice input via the voice inputter; and control to reduce visibility of the display when execution of the voice operation mode is started.

The non-transitory computer-readable recording medium according to the present invention may store a program that causes a computer, which includes a voice inputter/outputter, a display, and a controller and is connectable to a conversation server, to implement control to reduce visibility of the display when a conversation with the conversation server is started on the basis of voice input through the voice inputter/outputter.

According to the present invention, when an operation by voice is executed, control to reduce the visibility of the display is performed. Accordingly, a user of the information processor can clearly understand that an operation based on voice is to be performed, instead of performing the operation while looking at the display. Also, since the visibility of the display is reduced, the user can concentrate on the operation by voice without paying attention to the presence of the display.

BRIEF DESCRIPTION OF THE DRAWINGS

FIG. 7 is a flowchart showing the flow of a screen operation mode shift process in the first embodiment;

DESCRIPTION OF THE PREFERRED EMBODIMENTS

Hereinafter, embodiments of the present invention will be described with reference to the drawings. In the present embodiment, as an example, an information processing system including an image forming apparatus, which is provided with an information processor according to the present invention, and a server apparatus will be described.

1. First Embodiment

1.1 Overall Configuration

Figure 1:
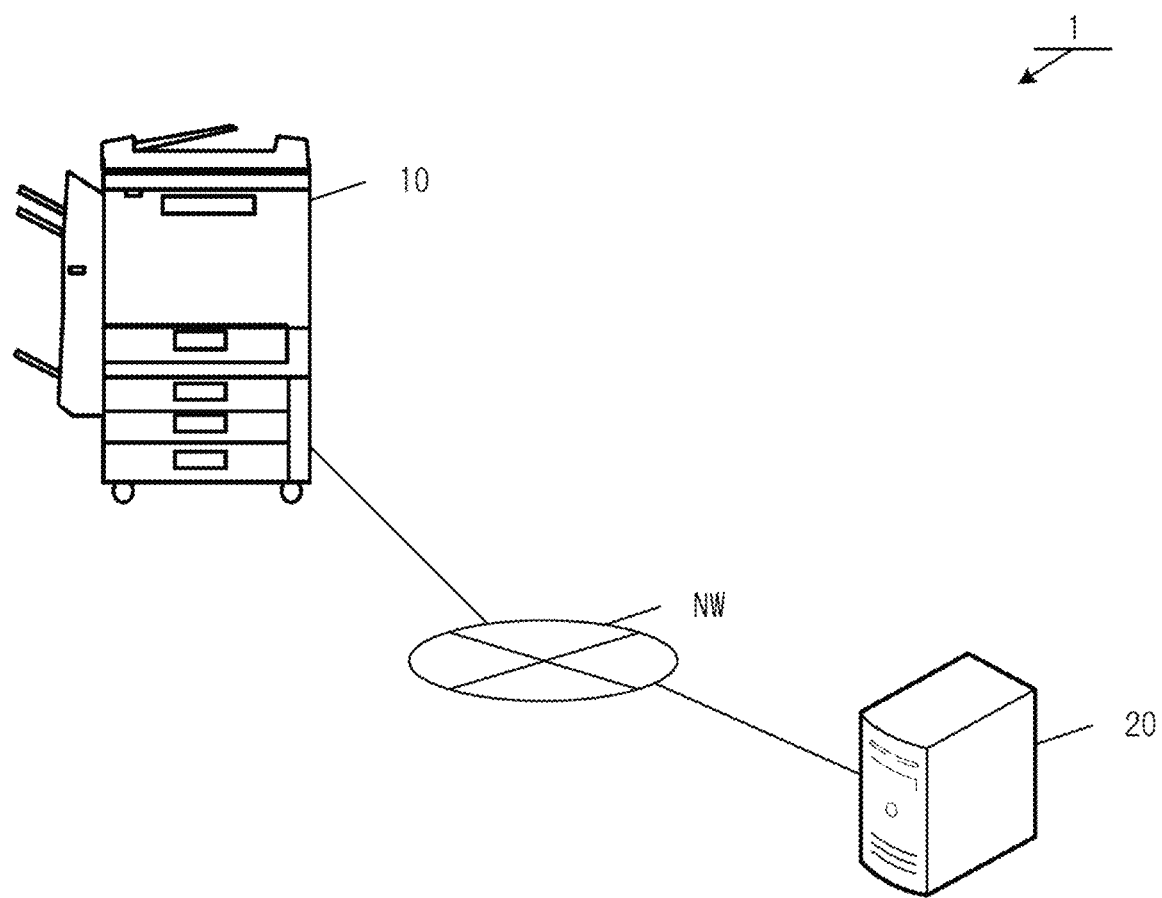
FIG. 1 is an illustration for explaining an overall configuration of an information processing system of a first embodiment.

First, the overall configuration of the first embodiment will be described. FIG. 1 is a diagram showing an information processing system 1 comprised of an image forming apparatus 10, and a server apparatus 20. The image forming apparatus 10 and the server apparatus 20 are connected to each other via a network NW. As the network NW, an external network such as the Internet is assumed. However, a local area network (LAN) or a network employing the other publicly known connection method may be used.

The image forming apparatus 10 includes a display and an operation inputter. A user of the image forming apparatus 10 performs an input operation related to desired processing via the operation inputter while checking the display (a screen). A mode in which the user performs the operation while checking the screen in this way is called a "screen operation mode".

Also, the image forming apparatus 10 includes a voice outputter, and a voice inputter. After the user of the image forming apparatus 10 listens to a voice output from the voice outputter, the user performs a voice operation by inputting a voice related to the desired processing through the voice inputter. A mode in which the user performs the operation by voice in this way is called a "voice operation mode".

The image forming apparatus 10 can switch the mode between the screen operation mode and the voice operation mode described above as the mode (operation mode) for accepting an operation from the user. Further, the image forming apparatus 10 changes the operation to be accepted from the user according to the operation mode.

The image forming apparatus 10 transmits an input voice, when the image forming apparatus 10 is operating in the voice operation mode, to the server apparatus 20 as voice data. The server apparatus 20 analyzes the received voice data, and generates a command that can be interpreted by the image forming apparatus 10. More specifically, when "perform scan" is received as the voice data, for example, a command for "scan" is generated. Note that the command may be a code such as a character string or a number indicating a specific function, or may be binary data. That is, the command may be in any form as long as the command can instruct execution of predetermined processing to the image forming apparatus 10.

Further, when execution of the processing cannot be instructed by a command generated by the server apparatus 20, the image forming apparatus 10 may output a voice prompting the user to give utterance regarding necessary information. For example, when a job to send scan data of a document to ABC, which is the destination of transmission registered in the image forming apparatus 10, is to be executed, two items of information, i.e., execution of a scan, and the transmission destination, which is ABC, are required. Here, when the server apparatus 20 receives the voice data which is "perform scan" from the image forming apparatus 10, the server apparatus 20 generates a command indicating that the image forming apparatus 10 is to execute a scan. When the image forming apparatus 10 receives a command indicating that the scan is to be executed from the server apparatus 20, the image forming apparatus 10 outputs, from a voice outputter 160, a voice inquiring about the transmission destination (for example, "Where would you like the scan data to be sent?").

Here, when the server apparatus 20 receives the voice data, which is "send to ABC", from the image forming apparatus 10, the server apparatus 20 generates a command (for example, "send to ABC") indicating that the image forming apparatus 10 is to send the scan data to ABC. When the image forming apparatus 10 receives the command indicating that the scan data is to be sent to ABC, the image forming apparatus 10 executes a job to transmit the scan data of the document to ABC, which is the transmission destination registered in the image forming apparatus 10, together with "scan" corresponding to the already received command.

As described above, the image forming apparatus 10 prompts the user to input a voice until execution of predetermined processing can be instructed, and the server apparatus 20 repeats generation of commands. Thereby, a job to be executed can be clarified. Also, the user inputs, by voice, necessary information to the image forming apparatus 10 while listening to the voice output from the image forming apparatus 10 until the job is executed. In the present embodiment, voice communication to be carried out between the user and the image forming apparatus 10 using the server apparatus 20 is referred to as "interaction".

As the image forming apparatus 10 acquires a command generated by the server apparatus 20, predetermined processing can be executed on the basis of the user's voice. As seen above, as the image forming apparatus 10 cooperates with the server apparatus 20, an operation by the voice operation mode is realized.

1.2 Functional Configuration

1.2.1 Image Forming Apparatus

Figure 2:
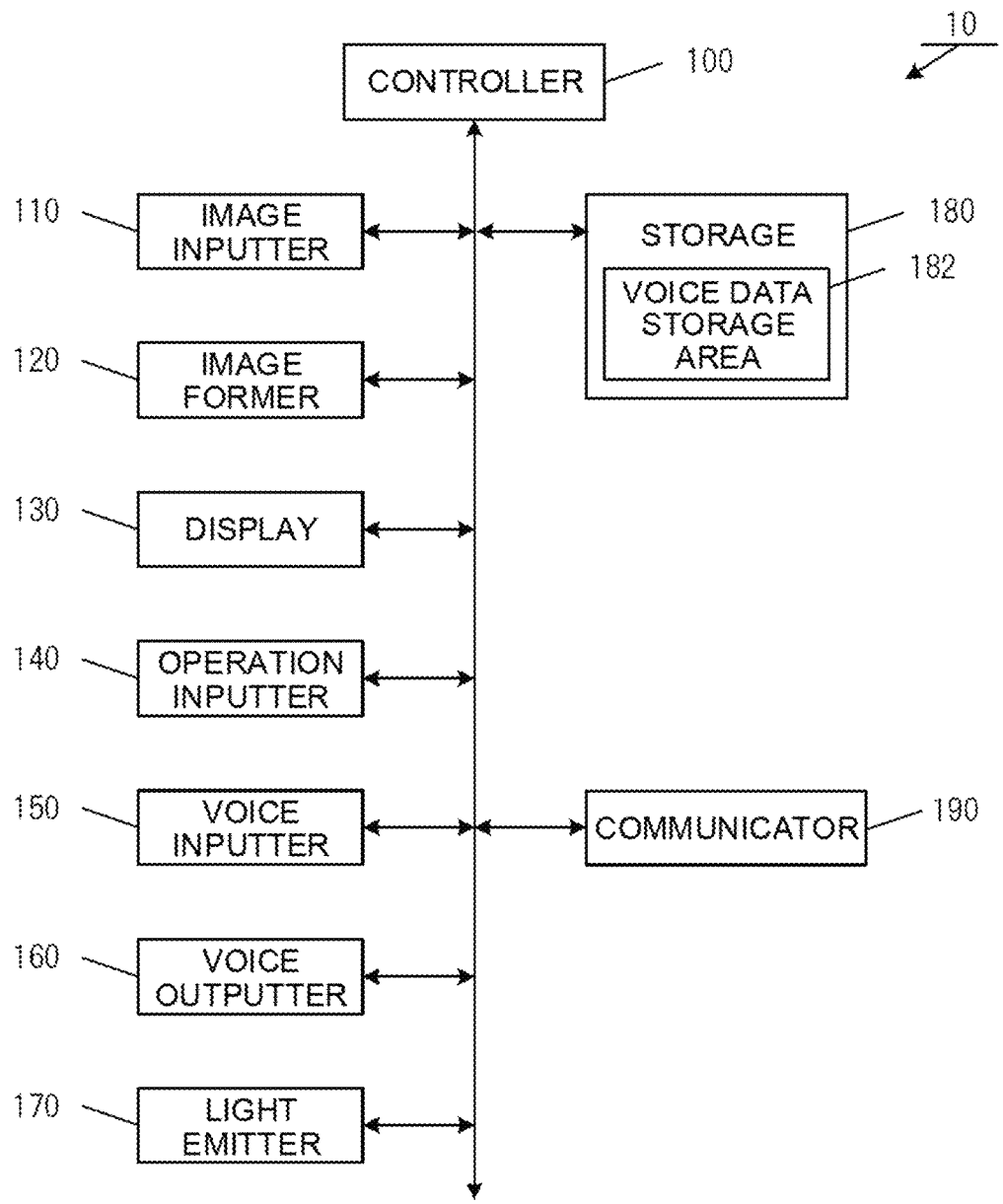
FIG. 2 is a diagram for explaining a functional configuration of an image forming apparatus of the first embodiment.

A functional configuration of the image forming apparatus 10 will be described with reference to FIG. 2. As shown in FIG. 2, the image forming apparatus 10 includes, as the constituent elements, a controller 100, an image inputter 110, an image former 120, a display 130, an operation inputter 140, a voice inputter 150, the voice outputter 160, a light emitter 170, a storage 180, and a communicator 190.

The controller 100 is a functional part for controlling the whole of the image forming apparatus 10. The controller 100 realizes various functions by reading and executing various programs, and is composed of, for example, one or more arithmetic devices (central processing units: CPUs).

The image inputter 110 is a functional part for reading image data input to the image forming apparatus 10. For example, a document reader such as a scanner is connected to the image inputter 110, and image data output from the document reader is input. Also, image data may be input from a storage medium such as a universal serial bus (USB) flash drive or an SD card.

The image former 120 is a functional part for forming output data based on the image data on a recording medium (for example, recording paper). For example, the image former 120 is composed of an electrophotographic laser printer.

The display 130 is a functional part for displaying various kinds of information to the user. For example, the display 130 is composed of a liquid crystal display (LCD). Further, the operation inputter 140 is a functional part for allowing the user to perform various operations. For example, the operation inputter 140 is composed of a touch panel that is placed over the display 130. Detection of a touch by the touch panel is realized by well-known techniques such as an electrostatic capacity method, a pressure sensing method, or the like. Note that the operation inputter 140 may be realized by a hard key or a combination of a touch panel and a hard key.

The voice inputter 150 is a functional part for converting a voice input from a voice input device (for example, a microphone) into voice data, and outputting the voice data to the controller 100. The voice inputter 150 may be a microphone previously provided in the image forming apparatus 10, or an external microphone connected to an input interface.

The voice outputter 160 is a functional part for outputting a voice based on the voice data. The voice outputter 160 may be a speaker previously provided in the image forming apparatus 10, or a voice output terminal for outputting a voice to an external apparatus.

The light emitter 170 is a functional part for controlling a light source so that light is emitted by the light source or the light emission of the light source is stopped. As the light source constituting the light emitter 170, various light sources such as a fluorescent tube, a light-emitting diode (LED), and a super luminescent diode (SLD) are considered. However, in the present embodiment, the LED is used. Alternatively, as a second display different from the display 130, the light emitter 170 may be configured by an LCD. The light source controlled by the light emitter 170 may be provided in the vicinity of the display 130. By doing so, the user of the image forming apparatus 10 is enabled to view the display 130, and the light source controlled by the light emitter 170 simultaneously. Also, the voice inputter 150 may be provided near the light source. By doing so, a voice of the user emitted toward the light source can be more easily input.

The light emitter 170 may be formed integrally with the light source. In the present embodiment, the light emitter 170 will be described as including a light source. Therefore, when it is described that the user is made to view the light emitter 170, the intended meaning is that the user is made to view the light source for which the light is turned on or off by the light emitter 170.

The storage 180 is a functional part for storing various programs necessary for the operation of the image forming apparatus 10, and various kinds of data. The storage 180 is composed of, for example, a solid-state drive (SSD), which is a semiconductor memory, or a hard disk drive (HDD).

In the storage 180, a voice data storage area 182, which is an area for storing voices input from the voice inputter 150 as voice data, is secured.

The communicator 190 is a functional part for enabling the image forming apparatus 10 to communicate with an external device. For example, the communicator 190 is composed of a communication module that can be connected to a network interface card (NIC) used in a wireless LAN, and long term evolution (LTE)/LTE-Advanced (LTE-A)/license-assisted access using LTE (LAA)/5G lines.

1.2.2 Server Apparatus

Figure 3:
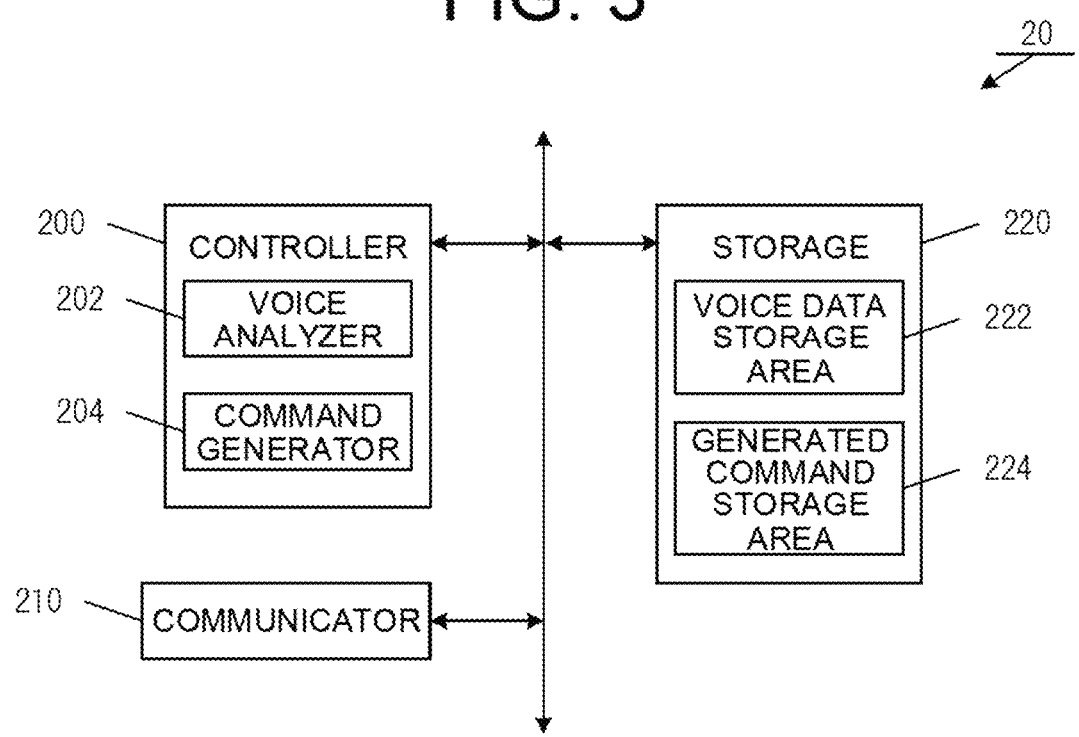
FIG. 3 is a diagram for explaining a functional configuration of a server apparatus of the first embodiment.

A functional configuration of the server apparatus 20 will be described with reference to FIG. 3. As shown in FIG. 3, the server apparatus 20 includes, as the constituent elements, a controller 200, a communicator 210, and a storage 220.

The controller 200 is a functional part for controlling the whole of the server apparatus 20. The controller 200 realizes various functions by reading and executing various programs, and is composed of, for example, one or more arithmetic devices (CPUs).

Also, as the controller 200 reads and executes the programs stored in the storage 220, the controller 200 functions as a voice analyzer 202 and a command generator 204. The voice analyzer 202 and the command generator 204 will be described later.

The communicator 210 is a functional part for enabling the server apparatus 20 to communicate with an external device. For example, the communicator 210 is composed of a communication module that can be connected to an NIC used in a wireless LAN, and the LTE/LTE-A/LAA/5G lines.

The storage 220 is a functional part for storing various programs necessary for the operation of the server apparatus 20, and various kinds of data. The storage 220 is composed of, for example, an SSD, which is a semiconductor memory, or an HDD.

In the storage 220, a voice data storage area 222, which is an area for storing voice data received via the communicator 210, and a generated command storage area 224, which is an area for storing commands generated by the command generator 204 are secured. The generated command storage area 224 includes a list storing the generated commands in the order in which the commands are generated by the command generator 204, for example. The generated command storage area 224 may be realized by storing a file in which the commands generated by the command generator 204 are stored in the form of a list, or may be realized by a database. Alternatively, the generated command storage area 224 may store only the last command generated by the command generator 204.

In addition, in a case where the server apparatus 20 receives voice data from a plurality of image forming apparatuses 10, information for identifying the image forming apparatus which has transmitted the voice data (for example, an IP address, a serial number, etc.) may be stored together with the command. By doing so, a command generated by the command generator 204 can be stored for each of the image forming apparatuses 10.

The voice analyzer 202 is a functional part for reading the voice data stored in the voice data storage area 222, and analyzing (recognizing) the voice data, thereby generating voice analysis data indicating the result of analysis of the voice data. The voice analysis data is, for example, a character string based on the voice data, more specifically, a character string indicating the utterance content of the user. Besides the utterance content, the voice analysis data may include information such as an utterance duration, the timing of silent state such as occurrence of breathing, and volume. Also, as a method for analyzing the voice data, a well-known voice recognition technology may be used.

The command generator 204 is a functional part for generating a command for the image forming apparatus 10, on the basis of the voice analysis data generated by the voice analyzer 202. Also, the command generator 204 stores the generated command in the generated command storage area 224.

As one method, the command generator 204 generates a command by using a keyword included in the utterance content of the user, for example. Specifically, the command generator 204 determines whether the utterance content of the voice analysis data generated by the voice analyzer 202 includes a keyword (for example, "scan" or "copy") indicating a job that can be executed by the image forming apparatus 10. If a keyword is included, the command generator 204 extracts the keyword, and generates a command corresponding to the keyword. The keyword and the command corresponding to the keyword may be stored in the storage 220 in advance, or set by an administrator or the like of the server apparatus 20.

As another method, the command generator 204 may store patterns of the utterance content in advance, and generate a corresponding command by extracting information included in the utterance content from the pattern and the utterance content. For example, the command generator 204 stores a pattern "execute <job detail>" as the pattern for extracting a job to be executed by the image forming apparatus 10 from the utterance content. If the utterance is "execute scan", it can be determined that "scan" of the utterance corresponds to the <job detail> of the pattern by comparing the utterance with the pattern for extracting the job. Therefore, from the utterance "execute scan", the command generator 204 can extract "scan" as the job to be executed by the image forming apparatus 10. Further, the command generator 204 generates a command for executing the scan.

In addition, the command may include information related to the job settings. As the information related to the job settings, information such as a color mode of the document (whether gray scale reading or color reading is to be adopted), a resolution of the document, the number of output (printing) copies, and a transmission destination of the scan data may be included.

Further, the command may include information other than job information. As the information other than job information, a command for terminating the voice operation mode, a command indicating that voice data analysis has failed, and a command indicating that command generation has failed may be included. When the image forming apparatus 10 receives a command for terminating the voice operation mode, the voice operation mode is terminated. Also, when the image forming apparatus 10 receives a command indicating that the analysis of the voice data has failed, or a command indicating that the command generation has failed, a voice such as "Can you say that again, please?" is output from the voice outputter 160. By doing so, the user can be prompted to speak again.

1.3 Flow of Process

Figure 4:
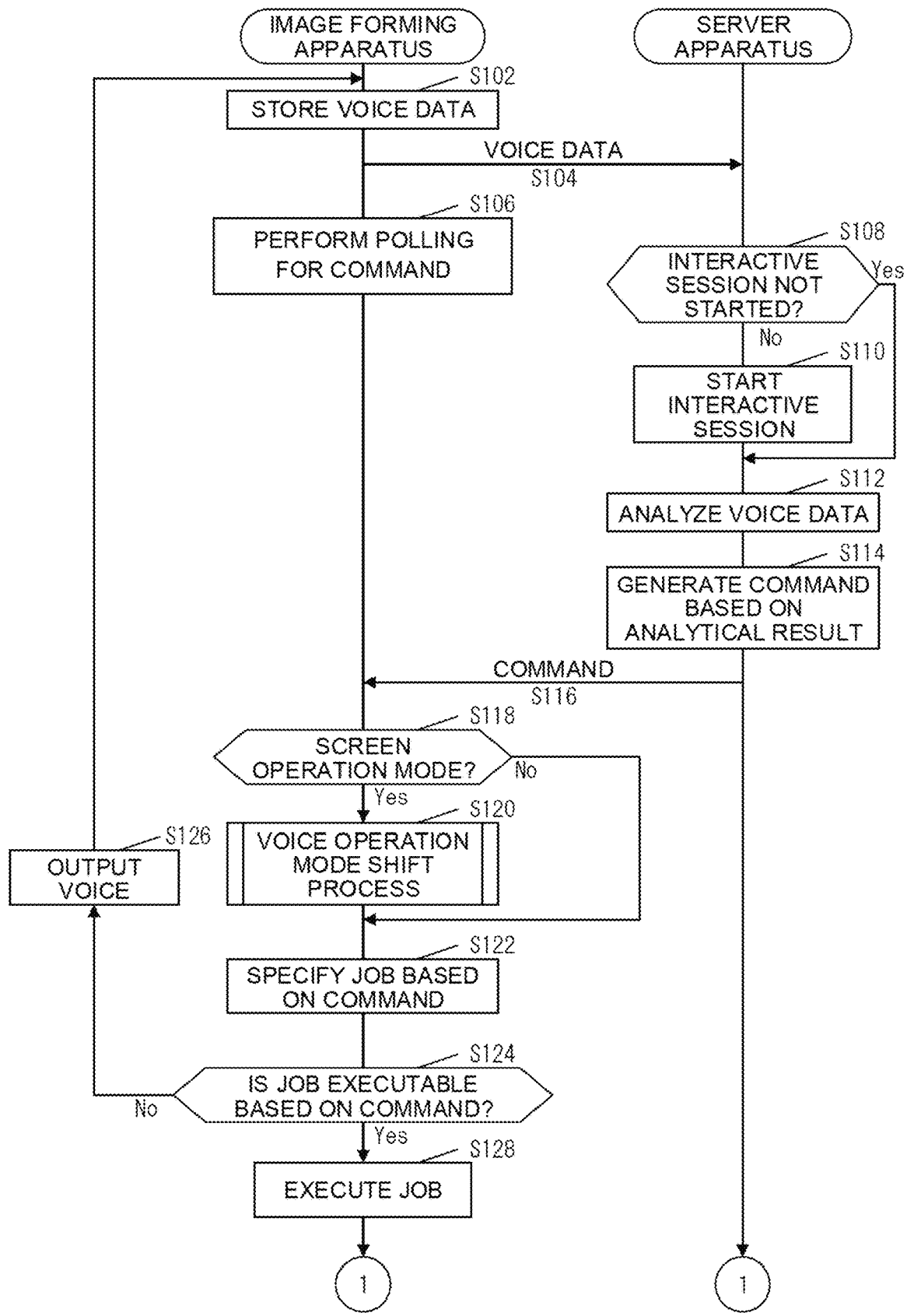
FIG. 4 is a sequence diagram of the first embodiment.
Figure 5:
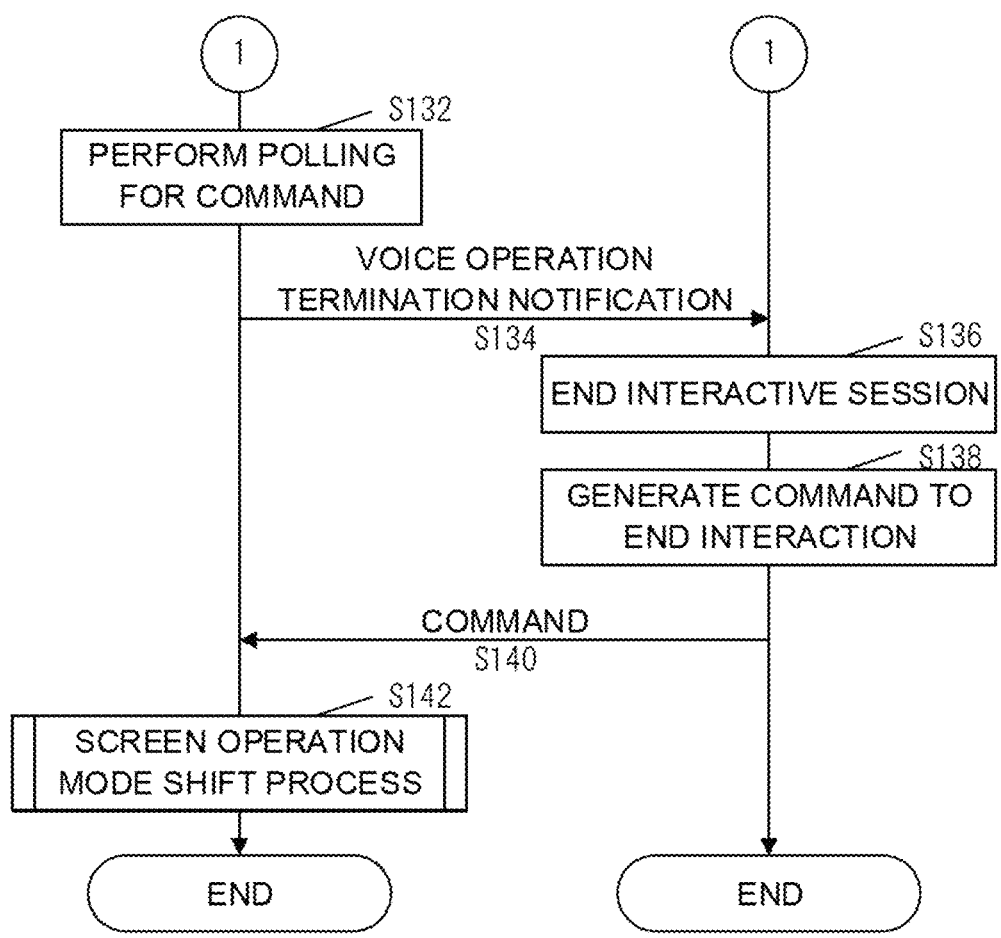
FIG. 5 is a sequence diagram of the first embodiment.

Next, a flow of the process of the present embodiment will be described. FIGS. 4 and 5 are sequence diagrams showing the processing executed by the image forming apparatus 10 and the server apparatus 20, and data to be exchanged between the image forming apparatus 10 and the server apparatus 20.

First, referring to FIG. 4, the controller 100 of the image forming apparatus 10 stores voice data based on voice input via the voice inputter 150 in the voice data storage area 182 (S102). Then, the controller 100 transmits the voice data stored in the voice data storage area 182 to the server apparatus 20 via the communicator 190 (S104). In order to acquire a command generated by the server apparatus 20, the controller 100 periodically establishes connection to the server apparatus 20, and performs polling to request transmission of the command (S106).

Next, when the controller 200 of the server apparatus 20 receives the voice data from the image forming apparatus 10, the controller 200 stores the received voice data in the voice data storage area 222. Further, the controller 200 determines whether an interactive session has been started or not. If the interactive session has not been started, the controller 200 starts the interactive session (i.e., if No in S108, proceed to S110).

The interactive session is a unit for the server apparatus 20 to manage the interaction. In the interactive session, the controller 200 extracts information related to the job (for example, information related to the type of the job and the job settings), and generates a command. The processing executed by the server apparatus 20 in the interactive session is realized by an application for managing the interactions stored in the server apparatus 20, specifically.

Next, as the voice analyzer 202 of the controller 200 generates voice analysis data by analyzing the voice data received from the image forming apparatus 10, the voice data is analyzed (S112). Then, the command generator 204 of the controller 200 generates a command on the basis of the voice analysis data (S114). Also, the command generator 204 stores the generated command in the generated command storage area 224.

The controller 100 requests transmission of the command generated by the server apparatus 20 by polling for the command, and acquires (receives) the command from the server apparatus 20 (S116). Note that when the controller 200 of the server apparatus 20 receives a request for the command transmission from the image forming apparatus 10, it suffices that the controller 200 transmits the command stored in the generated command storage area 224.

When the controller 100 receives a command from the server apparatus 20, the controller 100 determines whether the current operation mode is the screen operation mode or not (S118). When the current operation mode is the screen operation mode, the controller 100 executes a voice operation mode shift process in order to switch the mode to the voice operation mode (i.e., if Yes in S118, proceed to S120).

Figure 6:
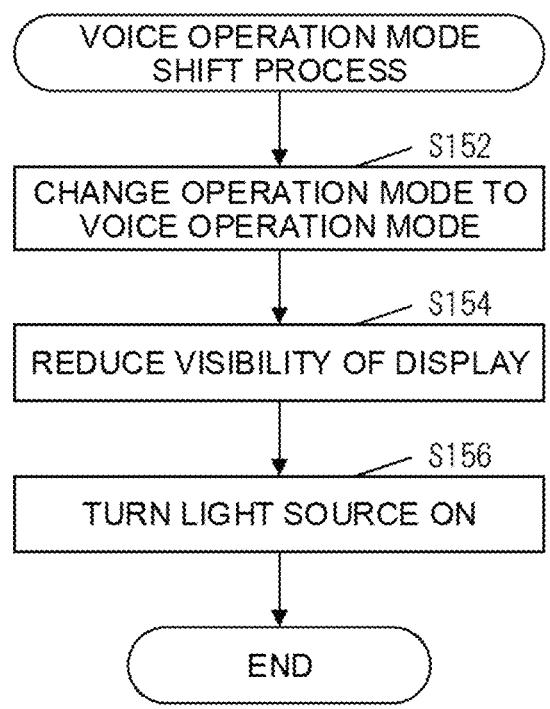
FIG. 6 is a flowchart showing the flow of a voice operation mode shift process in the first embodiment.

The voice operation mode shift process will be described with reference to FIG. 6. First, as the controller 100 changes (switches) the operation mode of the image forming apparatus 10 to the voice operation mode, the voice operation mode is started (S152). Further, the controller 100 executes the processing of reducing the visibility of the display 130 (S154).

As the processing of reducing the visibility of the display 130, the following processing, for example, is carried out.

(1) Dim Backlight of the Display 130

In a case where the display 130 is a display device which requires backlight such as an LCD, the backlight is dimmed or the backlight is turned off.

(2) Increase the Brightness of the Display 130

By increasing the brightness of the display 130, the entire screen of the display 130 is whitened. In this way, the display 130 is set to the so-called whiteout state. By allowing the materials displayed on the display 130 to be mixed with the background color, the displayed materials of the display 130 become hard to be seen by the user.

(3) Lower/Change the Contrast of the Display 130

By lowering or changing the contrast setting of the display 130, materials being displayed on the display 130 become hard to be seen by the user. For example, if the contrast of the display 130 can be specified by a numerical value such as a contrast level, the controller 100 specifies the lowest numerical value that can be specified as the contrast level. Alternatively, the controller 100 may specify a predetermined value as the contrast level, or specify a contrast level for the voice operation mode.

Also, instead of reducing the visibility, a screen indicating that the screen operation mode is not active may be displayed on the display 130. In this way, the user may be made to visually recognize that the operation mode has been switched from the screen operation mode to the voice operation mode.

(4) Display a Different Screen on the Display 130

Displayed materials of the display 130 may be displayed on a different screen. For example, instead of displaying buttons which can be touched for operation, a screen including information related to the job settings, a predetermined message (for example, "Please touch the screen if you wish to switch the mode to the screen operation mode"), the status of the image forming apparatus 10, or the like, is displayed. By doing so, the user can be made to visually recognize that a predetermined operation cannot be executed even if the display 130 is touched.

(5) Superimpose Another Image on the Displayed Material of the Display 130

A shaded image may be superimposed on the displayed material of the display 130, a color of low transparency may be superimposed on the entire display screen, or information related to the job settings may be superimposed on the display 130. By doing so, the displayed materials of the display 130 become hard to be seen by the user. For example, when a button which can be touched for operation is displayed on the display 130, by displaying another image to be superimposed on the display 130, the user is made to visually recognize that the button cannot be touched for operation when another image is superimposed and displayed.

As long as the visibility of the display 130 can be reduced by making the materials being displayed on the display 130 hard to be seen by the user, a method for realizing the visibility reduction may be any, and is not limited to the above-described method. Further, the controller 100 may reduce the visibility of the display 130, on the basis of a voice (an instruction from the user) input to the voice inputter 150.

Next, the controller 100 executes lighting (light emission) of the light source via the light emitter 170 (S156). If the light source of the light emitter 170 is an LED, the controller 100 controls the light emitter 170 to light the light source. At this time, as lighting control for the light source, the light emitter 170 may be illuminated or dimmed on the basis of a voice input to the voice inputter 150 or an operation, or may be illuminated or dimmed on the basis of a voice output from the voice outputter 160. Then, the voice operation mode shift process is terminated.

Returning to FIG. 4, next, the controller 100 specifies the job to be executed, on the basis of the command acquired from the server apparatus 20 (S122). Further, if the job specified on the basis of the command is executable, the job is executed (i.e., if Yes in S124, proceed to S128).

If the job is not executable, a voice is output to prompt the user to input the voice again (i.e., if No in S124, proceed to S126), and the processing returns to step S102.

Cases where the job is not executable are, for example, the following:

(1) Case where the Information Necessary for Executing the Job is Lacking

The first case corresponds to a case where a job cannot be executed due to a lack of necessary information. In this case, the controller 100 outputs a voice to the user so that further necessary information is input by voice. For example, if information on the destination of the scan data is lacking when a scan is to be executed, the controller 100 outputs a voice such as "Where would you like the scan data to be sent?" in step S126.

(2) Case where a Response is not Appropriate

The second case corresponds to a case where the information lacking state continues despite the output of a voice by the controller 100 for supplementing the lacking information due to inappropriateness of the interaction. This state can be detected as the controller 100 determines that the command acquired from the server apparatus 20 is the same as the previously acquired command. The commands being the same as each other signifies that no new information has been added, and the information necessary for executing the job is still lacking. In this case, the controller 100 outputs a voice such as "Could you say that again?" in step S126, and prompts the user to respond again.

(3) Case where a Voice is Unrecognizable

The third case corresponds to a case where a command indicating that the voice is unrecognizable is acquired from the server apparatus 20. Also in such a case, the information necessary for executing the job is lacking, and the image forming apparatus 10 cannot execute the job. In this case, the controller 100 outputs a voice such as "Could you say that again?" in step S126.

Referring to FIG. 5, when the controller 100 has executed the job on the basis of the command, the controller 100 then executes polling for another command (S132). Further, the controller 100 transmits a voice operation termination notification indicating that the voice operation mode is to be terminated to the server apparatus 20 via the communicator 190 (S134). The voice operation termination notification is a notification to be transmitted to the server apparatus 20 by the image forming apparatus 10, so as to notify the server apparatus 20 that the interaction between the image forming apparatus 10 and the server apparatus 20 is to be ended, and the voice operation mode in the image forming apparatus 10 is to be terminated. The voice operation termination notification may include specific data indicating that the voice operation mode is to be terminated, or a specific command.

When the controller 200 receives the voice operation termination notification from the image forming apparatus 10, the controller 200 ends the interactive session (S136). For example, the controller 200 deletes the voice data stored in the interactive session or information extracted from the voice data, or deletes the command stored in the generated command storage area 224. Then, the controller 200 generates a command to end the interaction (S138).

The controller 100 acquires a command to end the interaction which has been generated by the server apparatus 20 by the polling for the command (S140). Then, the controller 100 executes a screen operation mode shift process (S142).

The screen operation mode shift process will be described with reference to FIG. 7. First, as the controller 100 changes (switches) the operation mode of the image forming apparatus 10 to the screen operation mode, the screen operation mode is started (S172). Then, the controller 100 executes the processing of restoring the visibility (i.e., reinstating the visibility) of the display 130 to deal with the processing executed in step S154 (S174). For example, if the contrast has been lowered, the contrast is increased. Apart from the above, processing such as making the backlight bright when the backlight has been dimmed, restoring the brightness back to the original state when the brightness has been increased, or deleting the superimposed image when an image has been superimposed may be executed. Also, the controller 100 turns off the light source via the light emitter 170 (S176).

Next, the controller 100 sets the image forming apparatus 10 to a standby state so that the user operation by way of the operation inputter 140 is enabled by reinstating the screen displayed on the display 130 to the initial screen (S178). In this way, the screen operation mode shift process is terminated.

1.4 Operation Examples

Figure 8A:
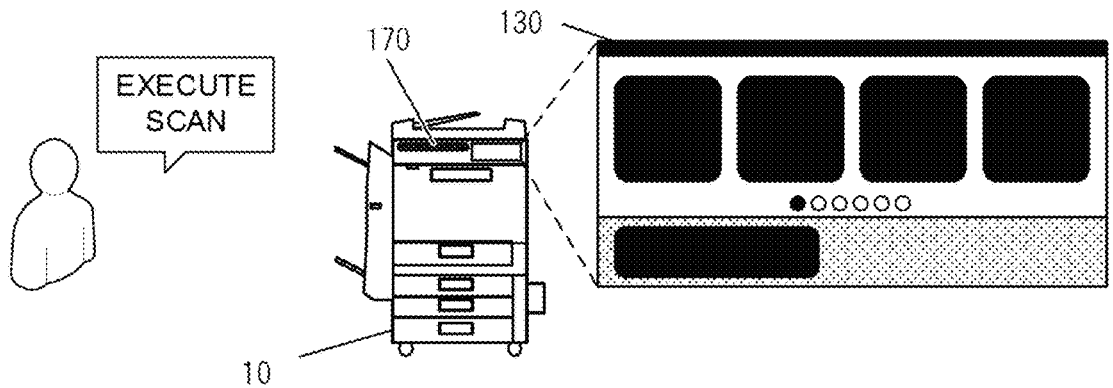
FIGS. 8A to 8C are illustrations showing an example of operation in the first embodiment.

With reference to FIGS. 8A to 8C and 9A to 9C, examples of operation of the present embodiment will be described. FIG. 8A is an illustration showing the case where a voice is input to the image forming apparatus 10 by the user when the operation mode of the image forming apparatus 10 corresponds to the screen operation mode. At the time when the voice is input, information regarding the image forming apparatus 10, and a UI screen are displayed on the display 130. Also, in the light emitter 170, the light source is turned off. If the operation inputter 140 is a touch panel provided on the display 130 in an overlapping manner, the user can operate buttons displayed on the display 130 by touching the operation inputter 140, which is the touch panel.

Figure 8B:
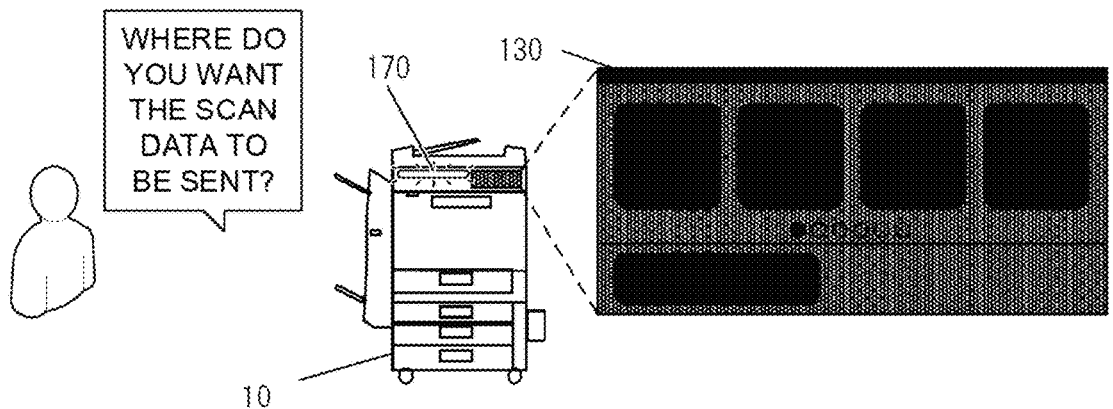

FIG. 8B is an illustration showing the case where the operation mode of the image forming apparatus 10 is switched to the voice operation mode as the voice is input. In this case, the visibility of the display 130 is reduced, and the light source is turned on by the control of the light emitter 170. By doing so, the server apparatus 20 clearly indicates to the user that an operation for the image forming apparatus 10 is to be performed by voice, and not by the display 130 or the operation inputter 140. Further, in order to obtain necessary information, the image forming apparatus 10 prompts the user to input voice by outputting a voice such as "Where do you want the scan data to be sent?".

Figure 8C:
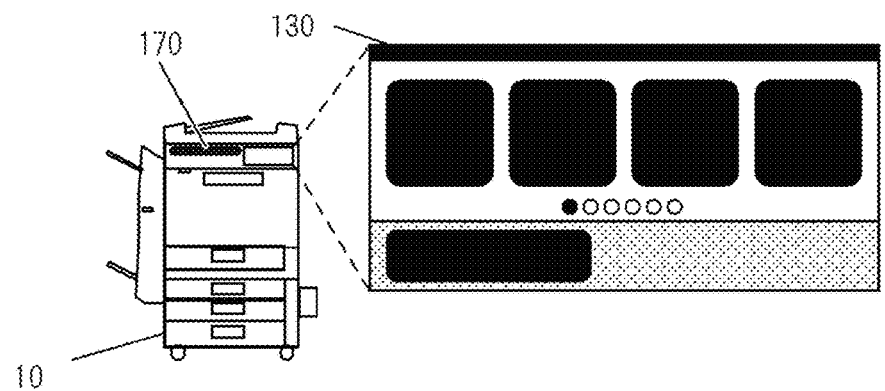

FIG. 8C is an illustration showing the case where execution of the job is completed, and the operation mode of the image forming apparatus 10 is switched to the screen operation mode. The image forming apparatus 10 restores the visibility of the display 130. Also, the light source is turned off by the control of the light emitter 170.

Figure 9A:
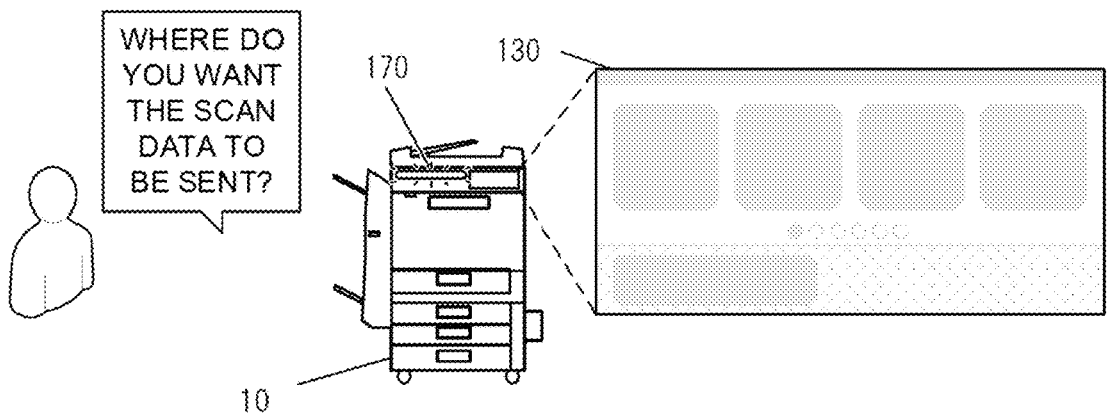
FIGS. 9A to 9C are illustrations showing an example of operation in the first embodiment.
Figure 9B:
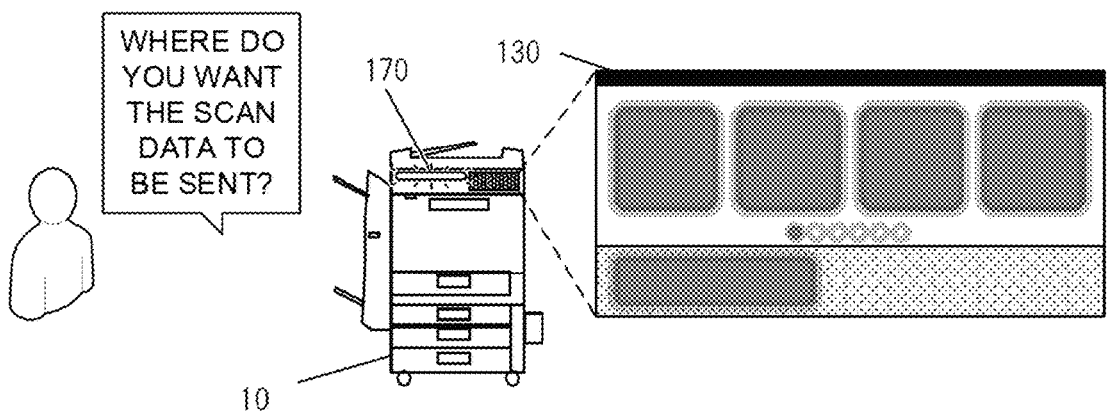
Figure 9C:
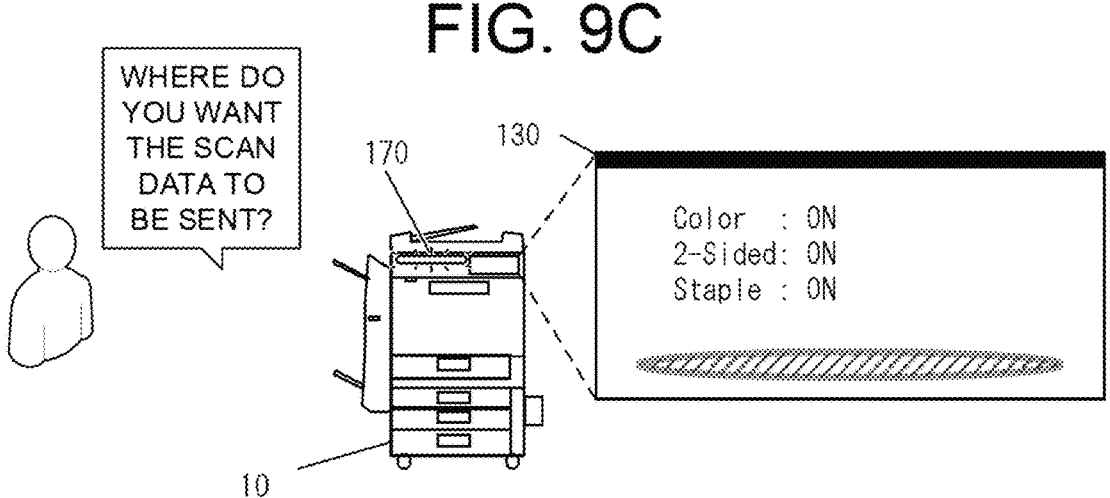

Further, FIGS. 9A to 9C show other examples of the screen displayed on the display 130 in the processing of reducing the visibility. FIG. 9A shows an example of the screen when the brightness of the display 130 is increased. The entire screen of the display 130 becomes brighter, and the visibility is reduced. FIG. 9B shows an example of the screen when the contrast of the display 130 is changed. For example, by lowering the contrast, colors of the background and the buttons become similar, and the visibility is reduced.

FIG. 9C shows an example of the screen when a different screen is displayed on the display 130. As shown in FIG. 9C, by displaying a screen including no button that can be selected by the user, the user is made to respond by voice. For example, when the image forming apparatus 10 outputs a voice saying "Where do you want the scan data to be sent?", since the user cannot specify the transmission destination by operating the display 130, the user is made to respond by voice. In FIG. 9C, job settings (for example, "Color: ON") are displayed on the display 130. In addition, at the bottom of the screen at the place indicated by hatching, the status of the image forming apparatus 10, and a display for prompting input by voice (for example, "Please talk to me by voice") may be displayed.

As described above, according to the present embodiment, by reducing the visibility of the display 130 when the voice operation mode is to be executed, the image forming apparatus 10 can decrease the sense of presence of the display 130 to the user of the image forming apparatus 10. Also, by turning on the light emitter 170, the attention of the user of the image forming apparatus 10 can be drawn to the light emitter 170. Consequently, the user can easily determine whether to perform the operation by inputting voice or via the display.

Also, when the apparatus is of a certain size as in the image forming apparatus 10, the user may not be able to understand the part of the apparatus the user should speak to. Furthermore, depending on the volume of the information displayed on the display, the size of the display, and the habit of operating the display, the user's attention may be caught by the presence of the display, and the user may not be able to concentrate on response by voice. As a result, the user may expect an operation feedback from the display, talk to the display, or concentrate on the display screen of the display. In such cases, the user may miss an optical response of the light emitter, or voice response by the voice outputter.

Even in such cases, by reducing the visibility of the display 130, and causing the light source to emit light by the light emitter 170, the attention of the user of the image forming apparatus 10 can be guided to and concentrated on the voice operation. As a result, it becomes possible to naturally make the user easily determine that an operation by voice can be performed. Also, the user feels as if he/she is talking to the image forming apparatus 10 naturally. Further, as emission of light is performed by control of the light emitter, the user can be made aware of the part where he/she should talk to in the image forming apparatus 10, and improvement of the recognition rate of the voice data can be realized.

Note that the processing not described above may be applicable. That is, the order of processes may be changed, or some of the steps may be omitted or changed within a range of not causing contradiction. For example, it has been described that the case where the interaction between the image forming apparatus 10 and the server apparatus 20 is terminated is when the server apparatus 20 receives a voice operation termination notification from the image forming apparatus 10. However, the way in which the interaction is terminated is not necessarily the above way. For example, the server apparatus 20 determines whether a command necessary for the image forming apparatus 10 to execute a predetermined job has been generated in the generated command storage area at the point when the command necessary for the image forming apparatus 10 to execute the job is stored, and the command is generated. When the command necessary for the image forming apparatus 10 to execute the predetermined job has been generated, a command to end the interaction may be generated. By doing so, the image forming apparatus 10 can terminate the voice operation mode even without transmission of the voice operation termination notification to the server apparatus 20.

The present embodiment has been described for the case where the present invention is applied to the image forming apparatus 10. However, as long as the apparatus is provided with a display, and an operation by voice can be performed in the apparatus, the present invention is applicable. For example, the present invention can be applied to an operating device such as a car navigation system or a cash register terminal, and a machining device in a factory, etc.

2. Second Embodiment

Next, a second embodiment will be explained. Different from the first embodiment, the second embodiment corresponds to an embodiment in which the operation mode of the image forming apparatus 10 is switched to the voice operation mode when a keyword for causing the operation mode to be shifted to the voice operation mode is input by voice.

Figure 10:
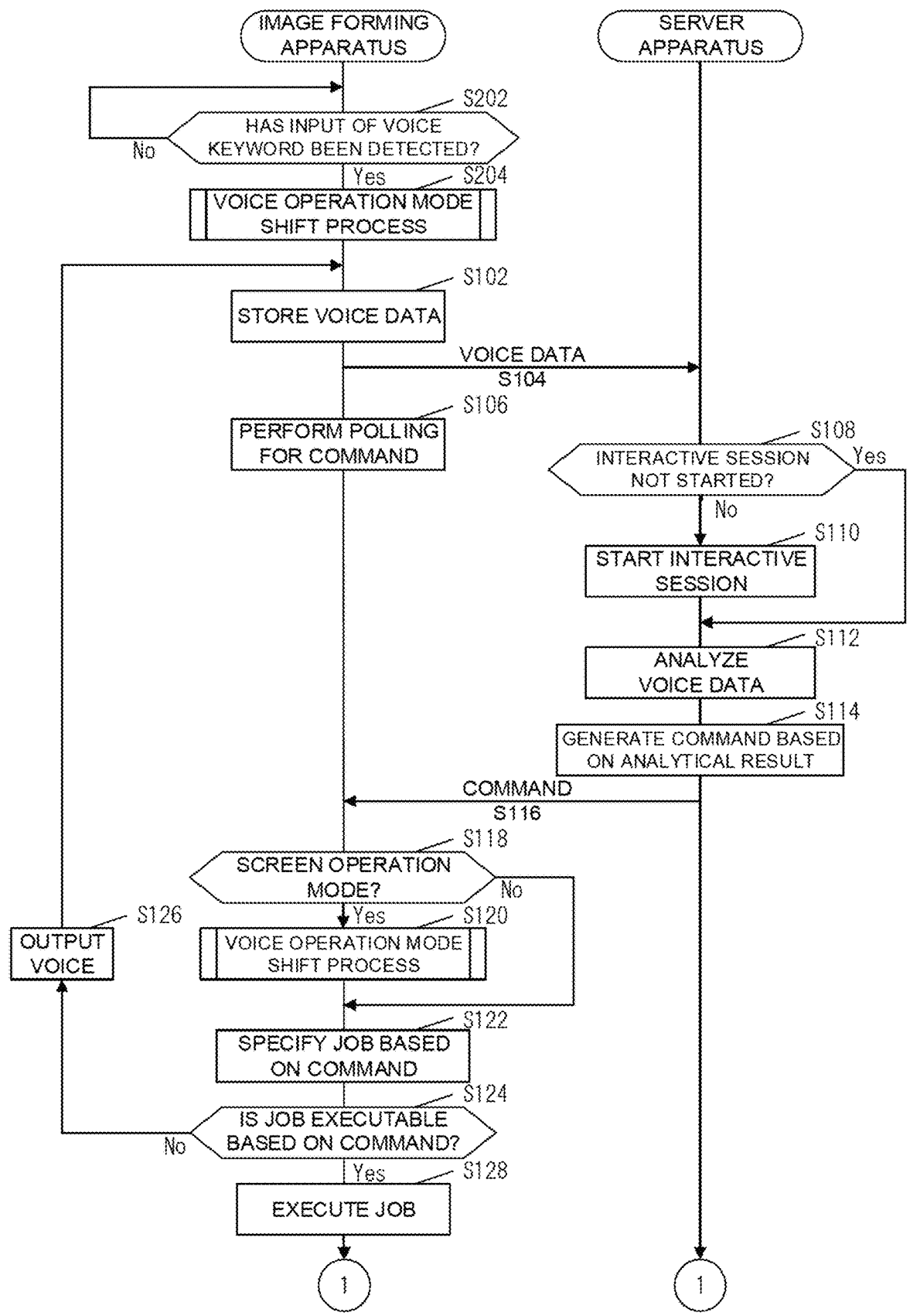
FIG. 10 is a sequence diagram of a second embodiment.

The present embodiment corresponds to FIG. 10 with some replacement having been made to FIG. 4 corresponding to the first embodiment. Note that the same reference numerals are assigned to the same functional parts and processes, and explanations thereof are omitted.

A flow of the process of the present embodiment will be described with reference to FIG. 10. First, a controller 100 of an image forming apparatus 10 detects whether a voice, which has been input via a voice inputter 150, includes a predetermined keyword (S202). The keyword is, for example, a term for a call to the image forming apparatus 10 (for example, "Hey", "Yo", "OK"), the name of the image forming apparatus 10, or a combination thereof. The keyword may be set in advance, or may be set by the user.

Whether the voice includes a keyword is determined as the controller 100 execute simple voice recognition. When the voice includes a keyword, the controller 100 executes a voice operation mode shift process (S204).

The processing carried out thereafter is the same as that of the first embodiment. However, since the processing can be executed on the assumption that the operation mode is shifted to the voice operation mode, there is no need for the controller 100 to determine the current operation mode when the controller 100 receives a command from a server apparatus 20.

According to the present embodiment, when a predetermined keyword is pronounced by the user, the operation mode is shifted to the voice operation mode. Accordingly, if the user does not wish to perform an operation by the voice operation mode, the user just needs to refrain from pronouncing the keyword, and the user can thereby select a method of operation.

Also, the image forming apparatus 10 can be prevented from transmitting voice data such as voices not related to the operation and noises to the server apparatus 20, and performing unnecessary polling for a command. Consequently, the image forming apparatus 10 can avoid executing a job not desired by the user by a voice not related to the operation, noise, or the like.

Note that an operation which allows the operation mode to be shifted to the voice operation mode may be other than the input operation of the voices as described above. For example, the shift may be realized when a predetermined gesture operation is detected on a touch panel, or by an operation of selecting a button enabling a shift to the voice operation mode or a hard key.

3. Third Embodiment

A third embodiment corresponds to an embodiment in which the operation mode of the image forming apparatus 10 is switched from the voice operation mode to the screen operation mode even when a job is not completed.

A flow of the process of the present embodiment will be described with reference to the drawing. In the present embodiment, as the case where the operation mode is switched from the voice operation mode to the screen operation mode, the following three cases will be described: (1) Case where an operation to terminate the voice operation mode is performed; (2) Case where no operation has been performed for a predetermined time; and (3) Case where an interaction termination condition is satisfied.

3.1 Case where Operation to Terminate the Voice Operation Mode is Performed

Figure 11:
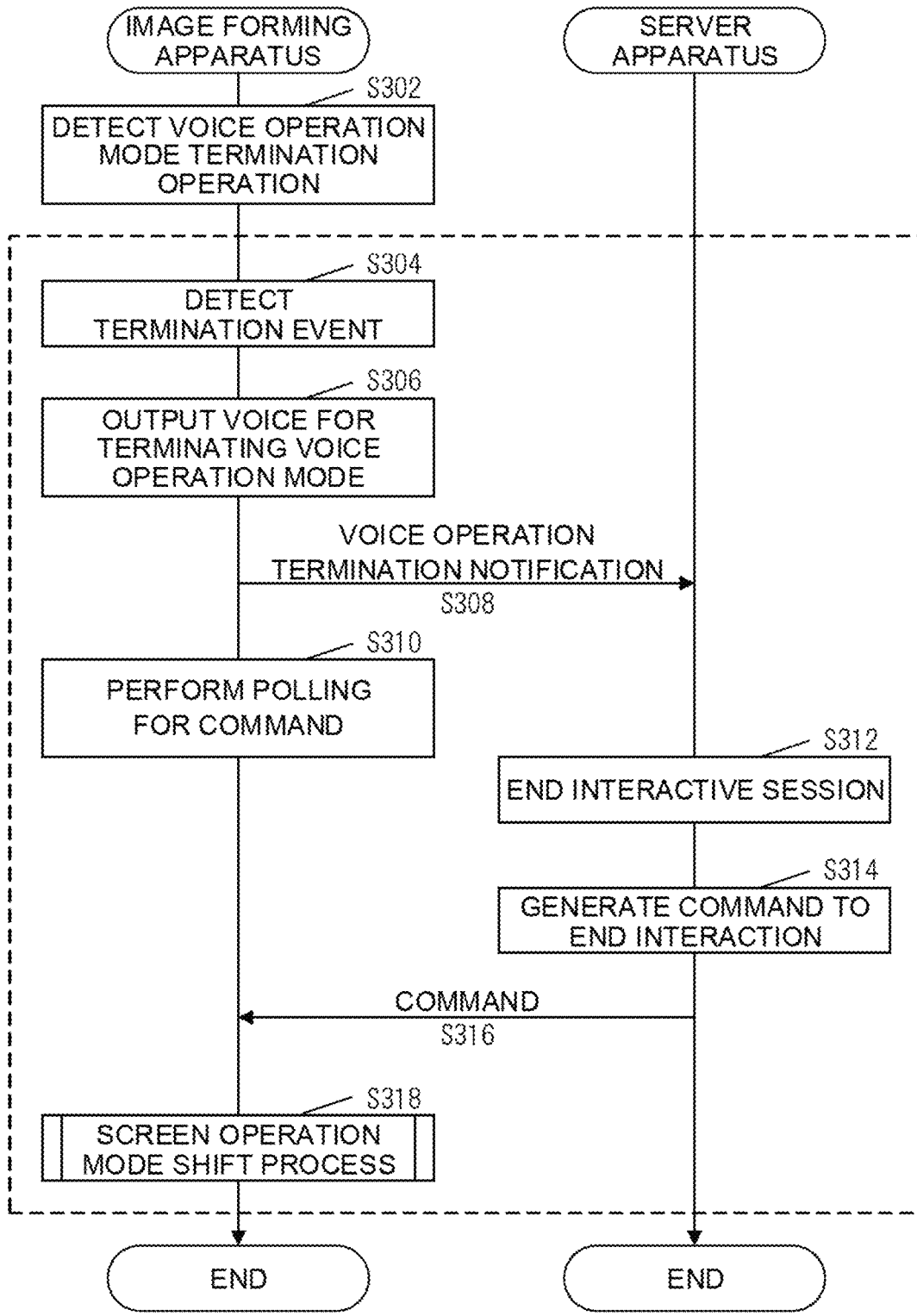
FIG. 11 is a sequence diagram of a third embodiment.

FIG. 11 is a sequence diagram showing the flow of a process to terminate the voice operation mode when an operation to terminate the voice operation mode is detected.

First, a controller 100 detects an operation for terminating the voice operation mode (S302). The operation for terminating the voice operation mode is an operation not related to a voice operation. For example, such an operation corresponds to an operation of touching a display 130 by the user, an operation of pressing a hard key, and an operation of opening and closing the door of an image forming apparatus 10.

By such an operation, a termination event is generated and output to the controller 100. The termination event is a signal or data indicating that the voice operation mode is to be terminated. For example, as the operation for touch is performed, a signal indicating that a touch has been made is output from the display 130 to the controller 100. Also, the operation of opening and closing of the door is detected by a sensor provided in the image forming apparatus 10, and a signal indicating that the door is opened or closed is output from the sensor to the controller 100.

When the controller 100 detects the termination event (S304), a voice for terminating the voice operation mode (for example, "Voice operation will be terminated") is output from a voice outputter 160 (S306). Then, the controller 100 transmits a voice operation termination notification to a server apparatus 20 via a communicator 190, and performs polling for a command (i.e., proceed to S308, and then to S310).

When a controller 200 receives the voice operation termination notification, the controller 200 ends the interactive session, and generates a command to end the interaction (proceed to S312, and then to S314).

When the controller 100 receives the command to end the interaction by the polling for the command, the controller 100 executes a screen operation mode shift process (i.e., proceed to S316, and then to S318). In the present embodiment, processing from S304 to S318 (i.e., the processing included in a rectangle shown by a dotted line in FIG. 11) is referred to as voice operation mode termination processing.

In this way, the user of the image forming apparatus 10 can intentionally terminate the voice operation mode.

3.2 Case where No Operation has been Performed for a Predetermined Time

Figure 12:
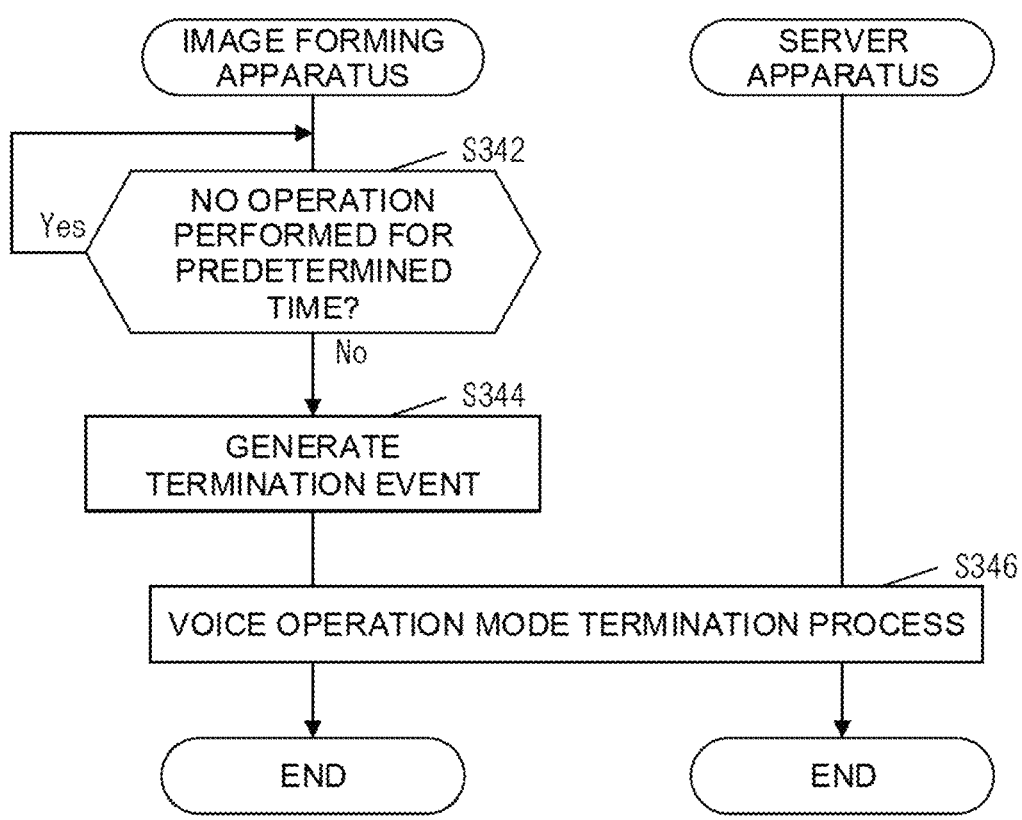
FIG. 12 is a sequence diagram of the third embodiment.

A flow of another process of the present embodiment will be described with reference to FIG. 12. FIG. 12 is a sequence diagram showing the flow of a process to terminate the voice operation mode when a user operation has not been performed for a predetermined time.

When the controller 100 determines that operations such as input of voices, touch on the display 130, and selection of a hard key are not being performed by the user for a certain period of time, the controller 100 generates a termination event (i.e., S342, and then proceed to S344). There being no voice inputs may be determined from the fact that a voice exceeding a predetermined volume has not been input from a voice inputter 150. In addition, the time for determining that no operation has been performed by the user may be defined in advance, or may be settable by the user.

Next, a voice operation mode termination process is executed by the image forming apparatus 10 and the server apparatus 20 (S346). The termination event generated in S344 is detected in step S304 included in the voice operation mode termination process. As described above, the voice operation mode can be terminated when no voice inputs have been made by the user for a certain period of time.

By the above feature, even if a certain user moves away from the image forming apparatus 10 while leaving the operation mode of the image forming apparatus 10 in the voice operation mode, the image forming apparatus 10 can transmit a voice operation termination notification to the server apparatus 20 after a predetermined time has elapsed. Therefore, even if another user operates the image forming apparatus 10 after a predetermined time has elapsed, the operation mode of the image forming apparatus 10 in effect can be the screen operation mode. Also, upon receipt of the voice operation termination notification transmitted from the image forming apparatus 10, the server apparatus 20 terminates the interactive session, and deletes information on the previous user. Accordingly, another user can execute a new job regardless of the content of inputs made by the previous user.

3.3 Case where Interaction Termination Condition is Satisfied

Figure 13:
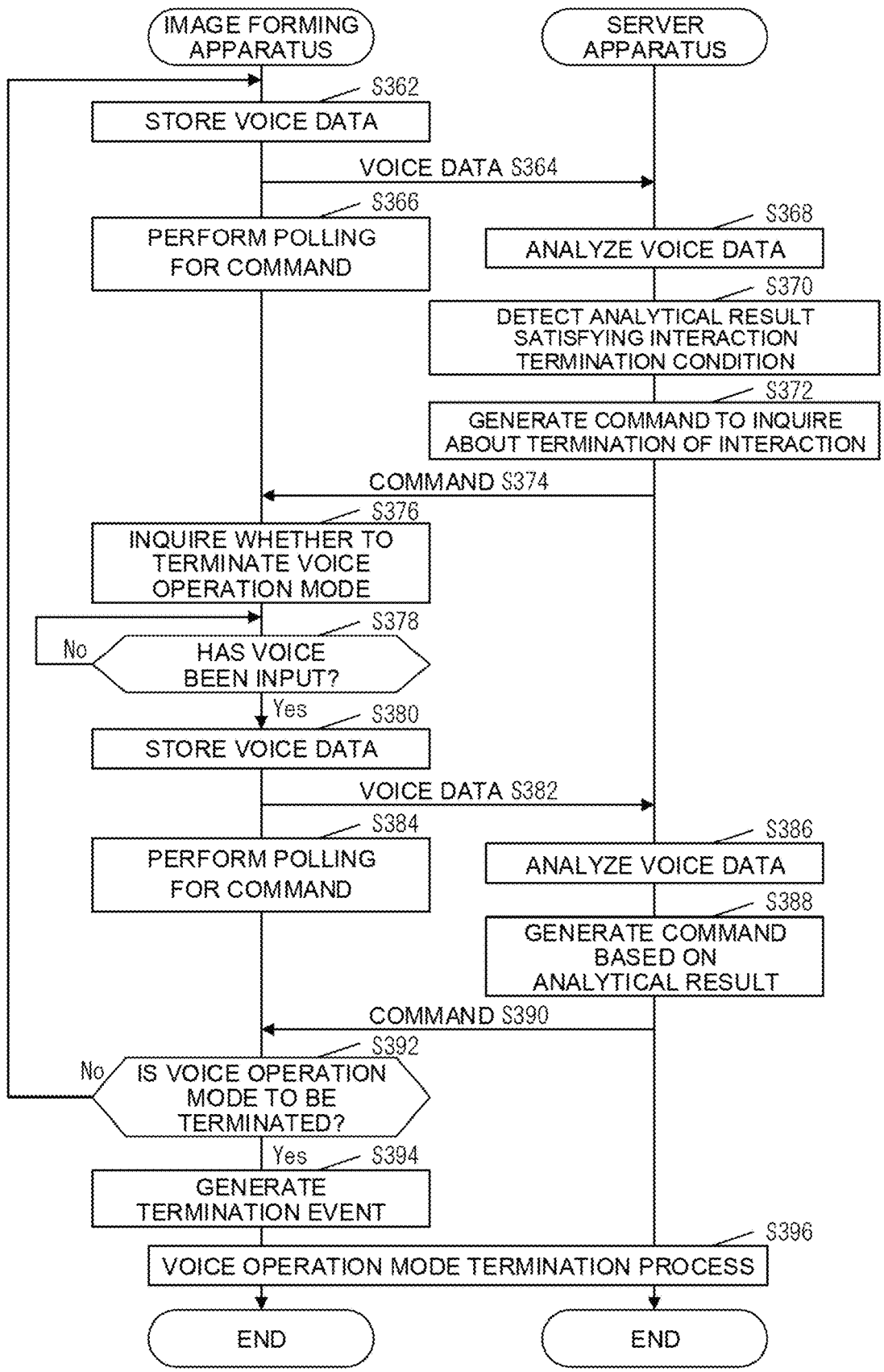
FIG. 13 is a sequence diagram of the third embodiment.

A flow of yet another process of the present embodiment will be described with reference to FIG. 13. FIG. 13 is a sequence diagram showing the flow of processing in which the server apparatus 20 transmits a command to terminate the voice operation mode to the image forming apparatus 10, on the basis of voice data transmitted from the image forming apparatus 10. Note that the sequence diagram shown in FIG. 13 is a diagram showing the flow of processing on the premise that the operation mode of the image forming apparatus 10 is the voice operation mode.

First, by the image forming apparatus 10, storage of voice data, transmission of the voice data, and polling for a command are performed (i.e., S362, proceed to S364, and then to S366). Next, when the controller 200 finishes analyzing the voice data received from the image forming apparatus 10 (S368), the controller 200 determines whether an analytical result satisfying an interaction termination condition is detected or not, as a result of the analysis of the voice data (S370).

The interaction termination condition is a condition for terminating the interaction between the server apparatus 20 and the image forming apparatus 10. The server apparatus 20 determines whether or not the interaction termination condition is satisfied on the basis of the analytical result of the voice data.

As the interaction termination condition, the following conditions, for example, are considered.

(1) Case where a Keyword Indicating that a Voice Operation is not Desired is Detected The server apparatus 20 stores, in a storage 220, expressions related to the user's frustration such as "I don't understand" and "I want to quit", and expressions indicating the intention of terminating the voice operation such as "I want to terminate the voice operation" as the keywords. Further, when such keywords are included in the voice data received from the image forming apparatus 10, it is determined that the interaction termination condition is satisfied.

(2) Case where a Voice Operation is Erroneously Performed is Detected

For example, as a result of analyzing the voice data, when a voice indicating the same content (for example, the content indicating a desire for the change of settings) is input exceeding a predetermined threshold (for example, ten times or more), it is possible that the interaction may not be conducted appropriately. In this case, it is considered that the user may not be responding appropriately to a voice inquiry output by the image forming apparatus 10. Also, if the controller 200 cannot specify a command based on the voice data, it is considered that the interaction may not be conducted appropriately. In such a case, it is considered that the user is erroneously performing the voice operation. Consequently, the controller 200 determines that the interaction termination condition is satisfied, on the assumption that the screen operation mode is more appropriate than the voice operation mode for operation. Note that the threshold may be stored in advance in the server apparatus 20, or may be set in the image forming apparatus 10. When the threshold is set in the image forming apparatus 10, it suffices that the image forming apparatus 10 transmits the threshold together in transmitting the voice data to the server apparatus 20.

(3) Case where Voice Data Cannot be Analyzed

This case corresponds to a case where voice analysis data, which includes information indicating that the voice data could not be analyzed due to misdetection or the like of the voice data, is output more than a certain number of times corresponding to a threshold, as the voice analysis data to be output from a voice analyzer 202. In such a case, it is considered that an abnormality may have occurred in the function related to the voice operation mode in the image forming apparatus 10. Consequently, the controller 200 determines that the interaction termination condition is satisfied, on the assumption that the screen operation mode is more appropriate than the voice operation mode for operation. Note that the threshold may be stored in advance in the server apparatus 20, or may be set in the image forming apparatus 10.

It should be noted that the interaction termination conditions as described above may be combined, and the determination may be made for these conditions. Also, the threshold mentioned in (2) and the threshold mentioned in (3) may be values different from each other. Needless to say, an interaction termination condition different from the above examples may be set.

When the interaction termination condition is satisfied, the controller 200 generates a command to inquire about termination of the interaction to the image forming apparatus 10 via a communicator 210 (S372).

When the controller 100 receives the command inquiring about the termination of the interaction as a result of performing the polling for the command, the controller 100 outputs a voice inquiring whether the voice operation mode is to be terminated (for example, "Do you want to end the voice operation?") via a voice outputter 160 (S378). Then, the controller 100 waits until a voice is input by the user.

When a voice is input from the user via the voice inputter 150, the image forming apparatus 10 stores the input voice as voice data, and transmits the stored voice data to the server apparatus 20 (i.e., if Yes in S378, proceed to S380, and then to S382). Note that the voice to be input here is either a positive expression or a negative expression such as "Yes" or "No", since what is expected here is a response to the inquiry asking whether to end the voice operation. Therefore, when a voice indicating an expression other than the positive or negative expression is input, the controller 100 may output a voice inquiring whether to terminate the voice operation mode again. In this way, the image forming apparatus 10 can obtain an agreement with the user on terminating the voice operation mode. Then, the controller 100 performs polling for a command to acquire the command generated in the server apparatus 20 (S384).

When the controller 200 receives the voice data, the controller 200 analyzes the voice data, and issues a command based on the analytical result (i.e., proceed to S386, and then to S388). In this case, the command issued by the controller 200 is either a command indicating that the voice operation mode is to be continued or a command indicating that the voice operation mode is to be terminated.

When the controller 100 receives the command from the server apparatus 20 as a result of polling for the command (S390), the controller 100 determines whether the received command indicates that the voice operation mode is to be terminated (S392). If the command indicates that the voice operation mode is to be terminated, the controller 100 generates a termination event, and executes a voice operation mode termination process (i.e., if Yes in S392, proceed to S394, and then to S396). If the command indicates continuation of the voice operation mode, the processing returns to S362, and the voice operation mode is continued.

By configuring the present embodiment as described above, in cases where the user feels frustrated about the voice operation mode, erroneously performs the voice operation, or is uncertain about the voice operation, for example, by the determination of the server apparatus 20, the operation mode can be switched to the screen operation mode. Therefore, on the basis of the user's intention of switching the operation mode to the screen operation mode, the image forming apparatus 10 can automatically terminate the voice operation mode, and switch the operation mode to the screen operation mode.

As described above, according to the embodiment, the operation mode can be switched from the voice operation mode to the screen operation mode even at a timing other than when the job is completed.

4. Fourth Embodiment

A fourth embodiment corresponds to an embodiment in which voice data analysis is performed by the image forming apparatus 10. The present embodiment corresponds to FIG. 14 with some replacement having been made to FIG. 2 corresponding to the first embodiment. Note that the same reference numerals are assigned to the same functional parts, and explanations thereof are omitted.

Figure 14:
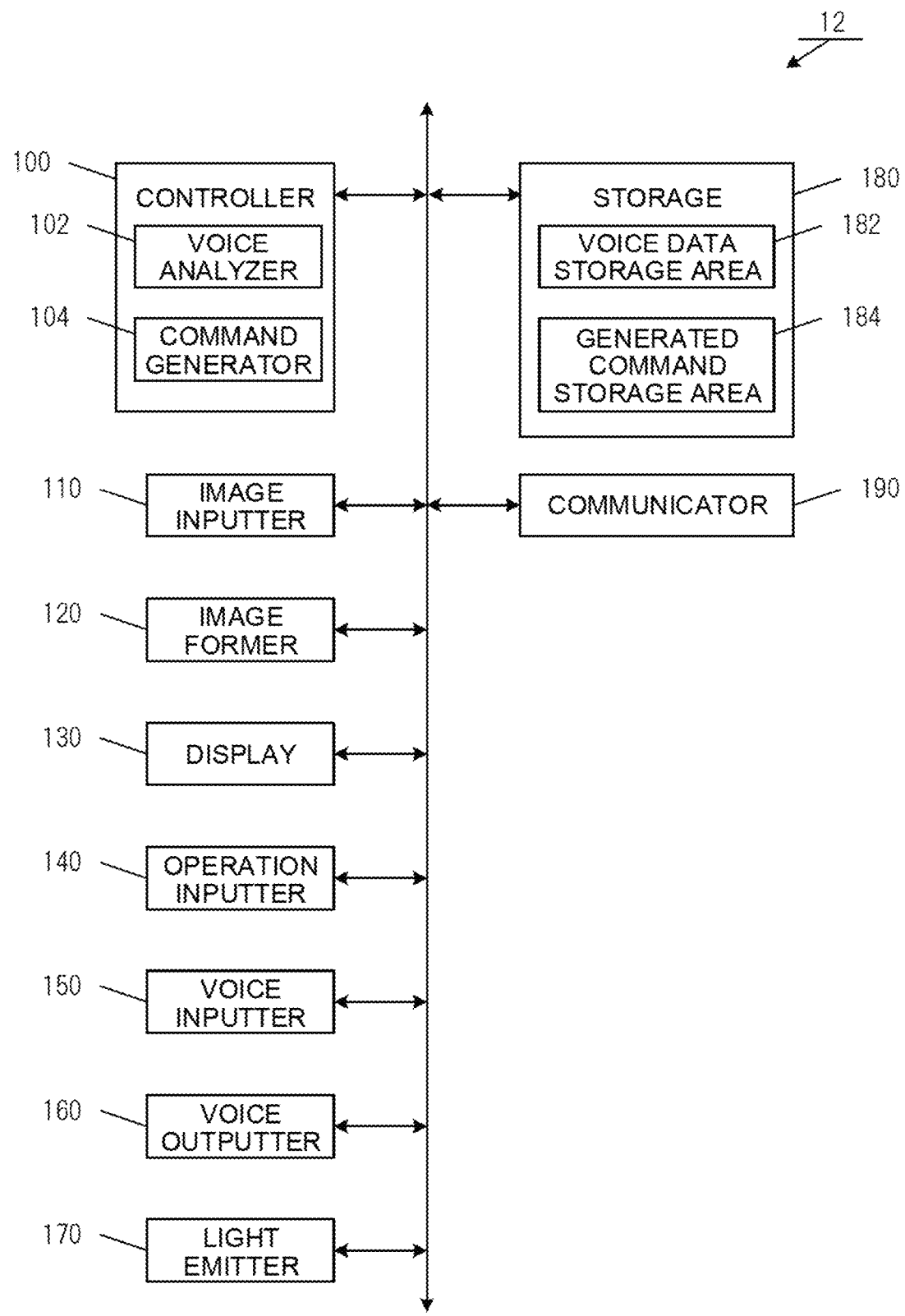
FIG. 14 is a diagram for explaining a functional configuration of an image forming apparatus of a fourth embodiment.

A functional configuration of an image forming apparatus 12 of the present embodiment will be described with reference to FIG. 14. As compared to the image forming apparatus 10, the image forming apparatus 12 is different in that a controller 100 functions as a voice analyzer 102 which analyzes voice data, and a command generator 104. The voice analyzer 102 corresponds to the voice analyzer 202, and the command generator 104 corresponds to the command generator 204, respectively.

Also, a distinguishing point is that a generated command storage area 184, which is an area for storing commands generated by the command generator 104, is secured in a storage 180. The generated command storage area 184 is an area corresponding to the generated command storage area 224.

Figure 15:
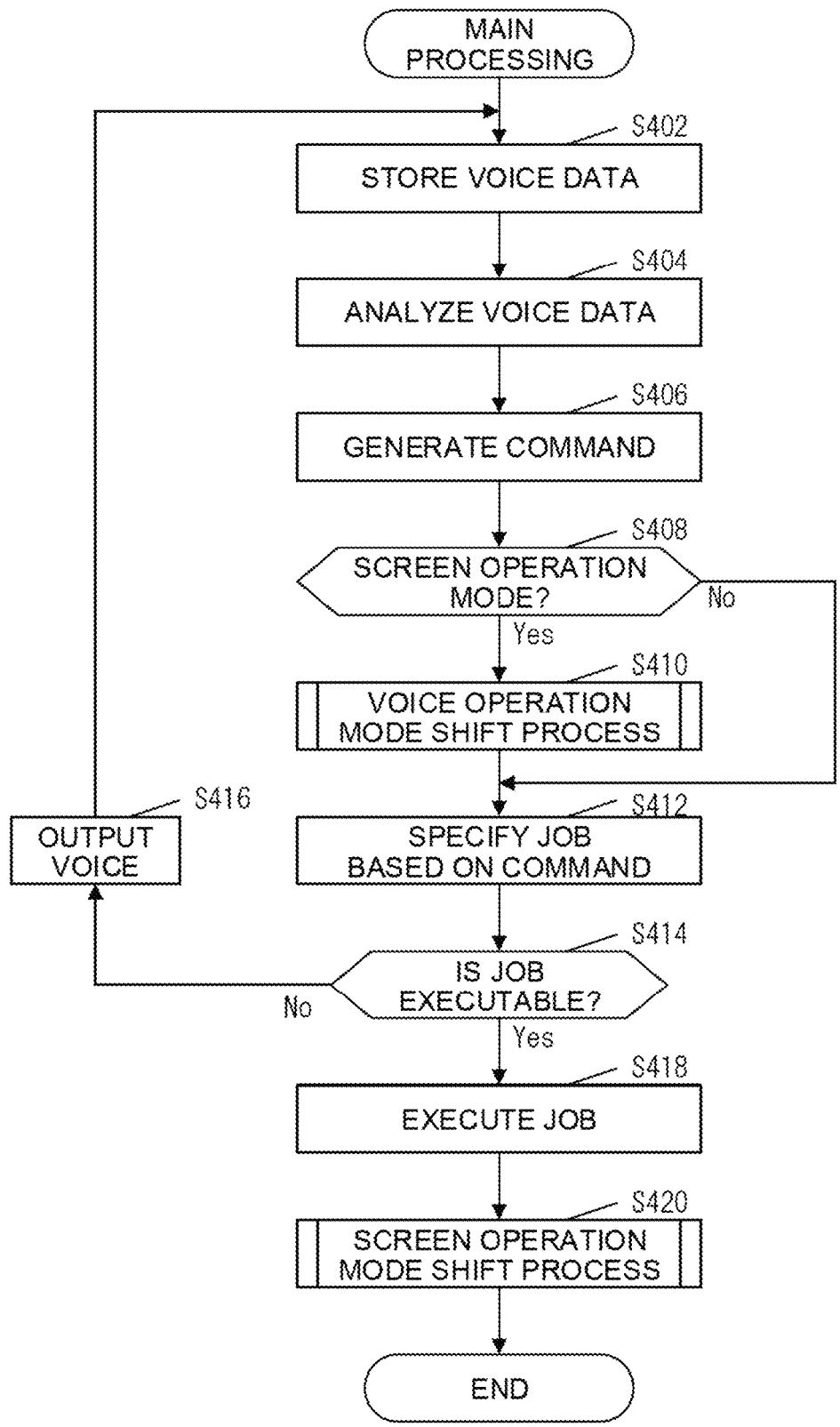
FIG. 15 is a flowchart for explaining the main processing of the image forming apparatus of the fourth embodiment.

Next, main processing of the image forming apparatus 12 will be described with reference to FIG. 15. First, when a voice is input by the user via a voice inputter 150, the controller 100 stores the input voice, as voice data, in a voice data storage area 182 (step S402).

Next, the voice analyzer 102 analyzes the voice data stored in the voice data storage area 182, and generates voice analysis data (step S404). Then, the command generator 104 generates a command on the basis of the voice analysis data (step S406). Note that the command generator 104 stores the generated command in the generated command storage area 184.

Next, the controller 100 determines whether the current operation mode of the image forming apparatus 12 is the screen operation mode or not. If the operation mode is the screen operation mode, the controller 100 executes a voice operation mode shift process (i.e., if Yes in step S408, proceed to step S410).

Next, the controller 100 specifies the job to be executed, on the basis of the command stored in the generated command storage area 184, and determines whether the job is executable (i.e., proceed to step S412, and then to step S414). If the job is executable, the controller 100 executes the job (i.e., if Yes in step S414, proceed to step S418). Then, the controller 100 executes a screen operation mode shift process (step S420).

If the job is not executable, it is considered that information necessary for executing the job may be lacking, the response may not be appropriate, or the voice may not have been recognized. In such a case, the controller 100 outputs a voice for prompting the user to respond again from a voice outputter 160, and the processing returns to step S402 (i.e., if No in step S414, proceed to step S416, and then to step S402).

According to the present embodiment, when the image forming apparatus 12 alone starts execution of the voice operation mode without being connected to the server apparatus 20, the image forming apparatus 12 is enabled to perform control to reduce the visibility of a display.

5. Modification Example

The present invention is not limited to the embodiments described above, and various modifications can be made. That is, an embodiment obtained by combining technical means appropriately modified without departing from the spirit of the present invention is also included in the technical scope of the present invention.

Also, although there are some parts in the above embodiments that are explained separately for convenience sake, it is needless to say that the embodiments may be combined within a technically feasible range for implementation.

Further, the programs operating on each of the apparatuses in the embodiments are programs for controlling the CPU and the like (i.e., programs causing the computer to function) so as to realize the functions of the above-described embodiments. Furthermore, information handled in such apparatuses is temporarily accumulated in a temporary memory device (e.g., RAM) when being processed. Then, the information is stored in a memory device such as various read-only memories (ROMs) or an HDD, and is read, modified, or written by the CPU, if necessary.

Here, as a recording medium for storing the program, any of a semiconductor medium (for example, a ROM, a non-volatile memory card, etc.), an optical recording medium and a magneto-optical recording medium (for example, a digital versatile disc [DVD], a magneto-optical disc [MO], a mini disc [MD], a compact disc [CD], a BD (Blu-ray [registered trademark]) disk, etc.), and a magnetic recording medium (for example, a magnetic tape, a flexible disk, etc.) may be employed. Moreover, not only the functions of the above-described embodiments are realized by execution of the loaded program, but the functions of the present invention may also be realized by processing carried out in cooperation with an operating system or other application programs, etc., on the basis of the instructions of the program.

Also, for distribution in the market, the program can be stored in a portable recording medium to be distributed, or transferred to a server computer connected via a network such as the Internet. In this case, needless to say, a memory device of the server computer is also included in the scope of the present invention.

What is claimed is:

1. An information processor comprising a voice inputter, a display, a light emitter, and a controller, wherein the controller
   executes a voice operation mode allowing an operation by voice input via the voice inputter,
   performs control to reduce visibility of materials being displayed on the display when execution of the voice operation mode is started, and
   performs control to cause the light emitter to emit light when the control to reduce the visibility of the materials being displayed on the display is performed.

2. The information processor according to claim 1, wherein the controller performs the control to reduce the visibility of the materials being displayed on the display when the voice input via the voice inputter includes a predetermined keyword.

3. The information processor according to claim 1, further comprising an operator that accepts an operation input made by a user, wherein
   the controller performs control to restore the visibility of the materials being displayed on the display when the operator accepts the operation input after reduction of the visibility of the materials being displayed on the display.

4. The information processor according to claim 1, wherein
   the controller performs control to restore the visibility of the materials being displayed on the display when no voice inputs are detected from the voice inputter for a predetermined time or longer.

5. The information processor according to claim 1, wherein the light emitter is provided near the display.

6. An information processor connectable to a conversation server,
   the information processor comprising a voice inputter/outputter, a display, a light emitter, and a controller, wherein
   the controller performs control to reduce visibility of materials being displayed on the display when a conversation with the conversation server is started based on voice input via the voice inputter/outputter, wherein
   the controller performs control to cause the light emitter to emit light when the control to reduce the visibility of the materials being displayed on the display is performed.

7. A control method for an information processor comprising a voice inputter, a display, a light emitter, and a controller, the control method comprising:
   executing a voice operation mode allowing an operation by voice input via the voice inputter;
   performing control to reduce visibility of materials being displayed on the display when execution of the voice operation mode is started; and
   performing control to cause the light emitter to emit light when the control to reduce the visibility of the materials being displayed on the display is performed.

8. A control method for an information processor comprising a voice inputter/outputter, a display, a light emitter, and a controller and being connectable to a conversation server, the control method comprising:
   performing control to reduce visibility of materials being displayed on the display when a conversation with the conversation server is started based on voice input via the voice inputter/outputter; and
   performing control to cause the light emitter to emit light when the control to reduce the visibility of the materials being displayed on the display is performed.

9. A non-transitory computer-readable recording medium having stored therein a program, the program causing a computer comprising a voice inputter, a display, a light emitter, and a controller to implement:
   a voice operation mode allowing an operation by voice input via the voice inputter;
   control to reduce visibility of materials being displayed on the display when execution of the voice operation mode is started; and
   control to cause the light emitter to emit light when the control to reduce the visibility of the materials being displayed on the display is performed.

10. A non-transitory computer-readable recording medium having stored therein a program, the program causing a computer, which comprises a voice inputter/outputter, a display, a light emitter, and a controller, and is connectable to a conversation server, to implement control to reduce visibility of materials being displayed on the display when a conversation with the conversation server is started based on voice input via the voice inputter/outputter and to cause the light emitter to emit light when the control to reduce the visibility of the materials being displayed on the display is performed.

* * * * *